United States Patent
Zhang (10) Patent No.: US 9,645,616 B2
(45) Date of Patent: May 9, 2017

(54) METHOD FOR CONTROLLING ELECTRONIC APPARATUS AND ELECTRONIC APPARATUS

(71) Applicants: Beijing Lenovo Software Ltd., Haidian District, Beijing (CN); Lenovo (Beijing) Co., Ltd., Haidian District, Beijing (CN)

(72) Inventor: Qiang Zhang, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 441 days.

(21) Appl. No.: 14/178,944

(22) Filed: Feb. 12, 2014

(65) Prior Publication Data

US 2014/0376145 A1 Dec. 25, 2014

(30) Foreign Application Priority Data

Jun. 20, 2013 (CN) .......................... 2013 1 0247449

(51) Int. Cl.
*H01H 47/00* (2006.01)
*G06F 1/16* (2006.01)
*A63F 9/24* (2006.01)

(52) U.S. Cl.
CPC .......... *G06F 1/1679* (2013.01); *G06F 1/1681* (2013.01); *A63F 2009/241* (2013.01); *G06F 1/1694* (2013.01)

(58) Field of Classification Search
USPC ........................................................ 361/143
See application file for complete search history.

(56) References Cited

U.S. PATENT DOCUMENTS 6,011,544 A * 1/2000 Sato ...................... G06F 1/1616
235/61 R
6,411,285 B1 * 6/2002 Miyazawa ............ G06F 3/0418
345/173

(Continued)

FOREIGN PATENT DOCUMENTS

| CN | 2710031 Y | 7/2005 |
|---|---|---|
| CN | 101598935 A | 12/2009 |
| CN | 2021 10473 U | 1/2012 |

OTHER PUBLICATIONS

Office Action, and English language translation thereof, in corresponding Chinese Application No. 201310247449.3, dated Feb. 3, 2017, 12 pages.

*Primary Examiner* — Danny Nguyen
(74) *Attorney, Agent, or Firm* — Brinks Gilson & Lione; G. Peter Nichols (57) ABSTRACT

A method for controlling an electronic apparatus is described where the electronic apparatus includes a first body, a second body on which a touch display unit is provided, and a rotary shaft used to connect the first body and the second body and through which the second body can rotate relative to the first body. The method includes determining whether the electronic apparatus is under a predetermined condition, so as to obtain a determination result; and when the determination result indicates that the electronic apparatus is under the predetermined condition, increasing a rotation resistance that the rotary shaft experiences during rotation of the rotary shaft, so as to cause the second body to reside in a non-rotational state relative to the first body when a user is touching the touch display unit.

18 Claims, 3 Drawing Sheets

(56) References Cited

U.S. PATENT DOCUMENTS

| | | | |
|---|---|---|---|
| 2004/0012920 A1* | 1/2004 | Tanimoto | G06F 1/162 |
| | | | 361/679.27 |
| 2012/0026681 A1* | 2/2012 | Wang | H05K 5/0226 |
| | | | 361/679.55 |

* cited by examiner

METHOD FOR CONTROLLING ELECTRONIC APPARATUS AND ELECTRONIC APPARATUS

BACKGROUND

This application claims priority to Chinese patent application No. 201310247449.3 filed on Jun. 20, 2013, the entire contents of which are incorporated herein by reference.

The present application relates to the field of electronics, and in particular to a method for controlling electronic apparatus and an electronic apparatus.

With the development of technology, computers have become widely used and brought a lot of conveniences to people's life and work.

Touch display screens have been widely used in computers because of having the advantages of accurate positioning, convenient operation and so on. For example, notebook computers installed with the Windows 8 operating system in the market usually are equipped with touch display screens.

However, in the process of implementing technical solutions in embodiments of the present application, the inventor of the present application has found that, the above technique has at least the following disadvantage:

In the prior art, a notebook computer with a touch display screen has a technical problem that when a user touches the touch display screen, the touch display screen is apt to rotate against a keyboard base, thus affecting the user's normal use.

SUMMARY

Embodiments of the present application, by providing a method for controlling electronic apparatus and an electronic apparatus, solve that a notebook computer with a touch display screen in the prior art has a technical problem that when a user touches the touch display screen, the touch display screen is apt to rotate against a keyboard base.

In an aspect, the present application provides the following technical solution through an embodiment thereof:

a method for controlling electronic apparatus, being applied to an electronic apparatus including a first body, a second body on which a touch display unit is provided, and a rotary shaft used to connect the first body and the second body and through which the second body can rotate relative to the first body, the method including:

determining whether the electronic apparatus is under a predetermined condition, so as to obtain a determination result; and when the determination result indicates that the electronic apparatus is under the predetermined condition, increasing the rotation resistance that the rotary shaft experiences during rotation of the rotary shaft, so as to cause the second body to reside in a non-rotational state relative to the first body when a user is touching the touch display unit.

Preferably, the electronic apparatus further includes:
an engagement module, which specifically includes:
a gear connected to the rotary shaft;
an electromagnet fixed to the first body; and
a movable slot provided on the first body,
wherein the movable slot can move to a position where the gear is located under an action of magnetic force of the electromagnet, and engage with the gear, thereby increase a rotation resistance that the rotary shaft experiences during rotation of the rotary shaft.

Preferably, determining whether the electronic apparatus is under a predetermined condition so as to obtain a determination result specifically is:

determining, through the touch display unit, whether the user is touching the touch display unit, so as to obtain a first determination result.

Preferably, when the determination result indicates that the electronic apparatus is under the predetermined condition, increasing a rotation resistance that the rotary shaft experiences during rotation of the rotary shaft specifically is:

when the first determination result indicates that the user is touching the touch display unit, applying a first current to the electromagnet, causing the electromagnet to generate the magnetic force on the movable slot, so that the movable slot moves towards a position where the gear is located, and engages with the gear, thereby increases the rotation resistance that the rotary shaft experiences during rotation of the rotary shaft.

Preferably, the second body can be detached from the first body, and a connection mode between the second body and the first body has a first connection mode and a second connection mode different from the first connection mode.

Preferably, the first body includes a first front plane within which a keyboard is embedded, and the second body includes a second front plane within which the touch display unit is embedded;

in this case, the first connection mode is a connection mode in which the second front plane can face the first front plane when a first angle value of a first angle between the second body and the first body is zero degrees; and the second connection mode is a connection mode in which the second front plane can have its back towards the first front plane when the first angle value between the second body and the first body is zero degrees.

Preferably, when the connection mode is the first connection mode, and the predetermined condition specifically is that the first angle value is larger than a first predetermined angle value, determining whether the electronic apparatus is under a predetermined condition so as to obtain a determination result specifically includes:

acquiring the first angle value; and
determining whether the first angle value is larger than the first predetermined angle value, so as to obtain a second determination result.

Preferably, when the determination result indicates that the electronic apparatus is under the predetermined condition, increasing a rotation resistance that the rotary shaft experiences during rotation of the rotary shaft specifically is:

when the second determination result indicates that the first angle value is larger than the first predetermined angle value, applying a first current to the electromagnet, causing the electromagnet to generate the magnetic force on the movable slot, so that the movable slot moves towards a position where the gear is located, and engages with the gear, thereby increases the rotation resistance that the rotary shaft experiences during rotation of the rotary shaft.

Preferably, when the connection mode is the second connection mode, and the predetermined condition specifically is that the first angle value is smaller than a second predetermined angle value, determining whether the electronic apparatus is under a predetermined condition so as to obtain a determination result specifically includes:

acquiring the first angle value; and
determining whether the first angle value is smaller than the second predetermined angle value, so as to obtain a third determination result.

Preferably, when the determination result indicates that the electronic apparatus is under the predetermined condition, increasing a rotation resistance that the rotary shaft experiences during rotation of the rotary shaft specifically is:

when the third determination result indicates that the first angle value is smaller than the second predetermined angle value, applying a first current to the electromagnet, causing the electromagnet to generate the magnetic force on the movable slot, so that the movable slot moves towards a position where the gear is located, and engages with the gear, thereby increases the rotation resistance that the rotary shaft experiences during rotation of the rotary shaft.

In another aspect, the present application provides the following technical solution through an embodiment thereof:

An electronic apparatus including a first body, a second body on which a touch display unit is provided, and a rotary shaft used to connect the first body and the second body and through which the second body can rotate relative to the first body, the electronic apparatus further including:

a determination unit for determining whether the electronic apparatus is under a predetermined condition, so as to obtain a determination result; and a control unit for, when the determination result indicates that the electronic apparatus is under the predetermined condition, increasing the rotation resistance that the rotary shaft experiences during rotation of the rotary shaft, so as to cause the second body to reside in a non-rotational state relative to the first body when a user is touching the touch display unit.

Preferably, the electronic apparatus further includes:
an engagement module, which specifically includes:
a gear connected to the rotary shaft;
an electromagnet fixed to the first body; and
a movable slot provided on the first body,
wherein the movable slot can move to a position where the gear is located under an action of magnetic force of the electromagnet, and engage with the gear, thereby increase a rotation resistance that the rotary shaft experiences during rotation of the rotary shaft.

Preferably, the determination unit specifically is:
a first determination configured to when the predetermined condition specifically is that a user is touching the touch display unit, determine, through the touch display unit, whether the user is touching the touch display unit, so as to obtain a first determination result.

Preferably, the control unit specifically is:
a first control configured to when the first determination result indicates that the user is touching the touch display unit, apply a first current to the electromagnet, cause the electromagnet to generate the magnetic force on the movable slot, so that the movable slot moves towards a position where the gear is located, and engages with the gear, thereby increases the rotation resistance that the rotary shaft experiences during rotation of the rotary shaft.

Preferably, the second body can be detached from the first body, and a connection mode between the second body and the first body has a first connection mode and a second connection mode different from the first connection mode.

Preferably, the first body includes a first front plane within which a keyboard is embedded, and the second body includes a second front plane within which the touch display unit is embedded;

in this case, the first connection mode is a connection mode in which the second front plane can face the first front plane when a first angle value of a first angle between the second body and the first body is zero degrees; and the second connection mode is a connection mode in which the second front plane can have its back towards the first front plane when the first angle value of a first angle between the second body and the first body is zero degrees.

Preferably, the determination unit specifically includes:
a first acquisition configured to when the connection mode is the first connection mode, and the predetermined condition specifically is that the first angle value is larger than a first predetermined angle value, acquiring the first angle value; and a second determination subunit for determining whether the first angle value is larger than the first predetermined angle value, so as to obtain a second determination result.

Preferably, the control unit specifically is:
a second control configured to when the second determination result indicates that the first angle value is larger than the first predetermined angle value, applying a first current to the electromagnet, causing the electromagnet to generate the magnetic force on the movable slot, so that the movable slot moves towards a position where the gear is located, and engages with the gear, thereby increases the rotation resistance that the rotary shaft experiences during rotation of the rotary shaft.

Preferably, the determination unit specifically includes:
a second acquisition configured to when the connection mode is the second connection mode and the predetermined condition specifically is that the first angle value is smaller than a second predetermined angle value, acquiring the first angle value; and a third determination subunit for determining whether the first angle value is smaller than the second predetermined angle value, so as to obtain a third determination result.

Preferably, the control unit specifically is:
a third control configured to when the third determination result indicates that the first angle value is smaller than the second predetermined angle value, applying a first current to the electromagnet, causing the electromagnet to generate the magnetic force on the movable slot, so that the movable slot moves towards a position where the gear is located, and engages with the gear, thereby increases the rotation resistance that the rotary shaft experiences during rotation of the rotary shaft.

The one or more technical solutions provided in embodiments of the present application at least have the following technical effects or advantages:

1. In an embodiment of the present application, there is disclosed a method for controlling electronic apparatus, being applied to an electronic apparatus including a first body, a second body on which a touch display unit is provided, and a rotary shaft used to connect the first body and the second body and through which the second body can rotate relative to the first body, the method including: determining whether the electronic apparatus is under a predetermined condition, so as to obtain a determination result; and when the determination result indicates that the electronic apparatus is under the predetermined condition, controlling the rotary shaft to be in a locking status, so as to cause the second body to reside in a non-rotational state relative to the first body when a user is touching the touch display unit. Therefore, a notebook computer with a touch display screen has a technical problem that when a user touches the touch display screen, the touch display screen is apt to rotate against a keyboard base in the prior art is solved efficiently, thereby the technical effect that when a user is using a notebook computer with a touch display screen, the touch display screen will not rotate against a keyboard base, thus bringing use convenience to the user is achieved.

2. In an embodiment of the present application, by means of detecting whether a user is using the touch display unit, increasing a rotation resistance that the rotary shaft experiences during rotation of the rotary shaft when the user is using the touch display unit, so as to cause the second body and the first body to reside in a non-rotational state, not increasing the rotation resistance when the user is not using the touch display unit, at this time the user can easily rotate the first body and the second body, thereby the technical effect of controlling the rotation resistance on the rotary shaft accurately according to the user's use requirements is achieved.

3. In an embodiment of the present application, the first body and the second body are two detachable bodies, and there are two connection modes between the first body and the second body, i.e., the "first connection mode" shown in FIG. 2 and the "second connection mode" shown in FIG. 3. The embodiment of the present application is based on different connection modes between the first body and the second body, and an angle range of the first angle between the first body and the second body as habitually set by the user when using the touch display unit, by determining whether the first angle is within the angle range, if yes, the rotation resistance on the rotary shaft is increased, so as to cause the second body to reside in a non-rotational state relative to the first body when the user is touching the touch display unit. Thereby the technical effect of combining the using habits of the user to adjust the rotation resistance on the rotary shaft, and meet the user's actual needs is achieved. For example, when the connection mode between the first body and the second body is the "first connection mode", the user habitually sets the first angle to an angle larger than 105 degrees when using the touch display screen, in this case, by detecting whether the first angle is greater than 105 degrees, if yes, then the rotation resistance on the rotary shaft is increased, so that the first body and the second body cannot rotate relatively, if not, the rotation resistance on the rotary shaft will not be increased, so that the first body and the second body can be rotated freely.

DETAILED DESCRIPTION

Embodiments of the present application, by providing a method for controlling electronic apparatus and an electronic apparatus, solve that a notebook computer with a touch display screen in the prior art has a technical problem that when a user touches the touch display screen, the touch display screen is apt to rotate against a keyboard base.

In order to solve the above technical problem, technical solutions in embodiments of the present application have the general concept as follows:

A method for controlling electronic apparatus, being applied to an electronic apparatus including a first body, a second body on which a touch display unit is provided, and a rotary shaft used to connect the first body and the second body and through which the second body can rotate relative to the first body, the method including:

first, determining whether the electronic apparatus is under a predetermined condition, so as to obtain a determination result; and thereafter, when the determination result indicates that the electronic apparatus is under the predetermined condition, increasing a rotation resistance that the rotary shaft experiences during rotation of the rotary shaft, so as to cause the second body to reside in a non-rotational state relative to the first body when a user is touching the touch display unit.

To better understand the above technical solutions, the technical solutions will be described in detail in conjunction with the accompanying drawings and the specific implementing modes below.

First Embodiment

Figure 1:
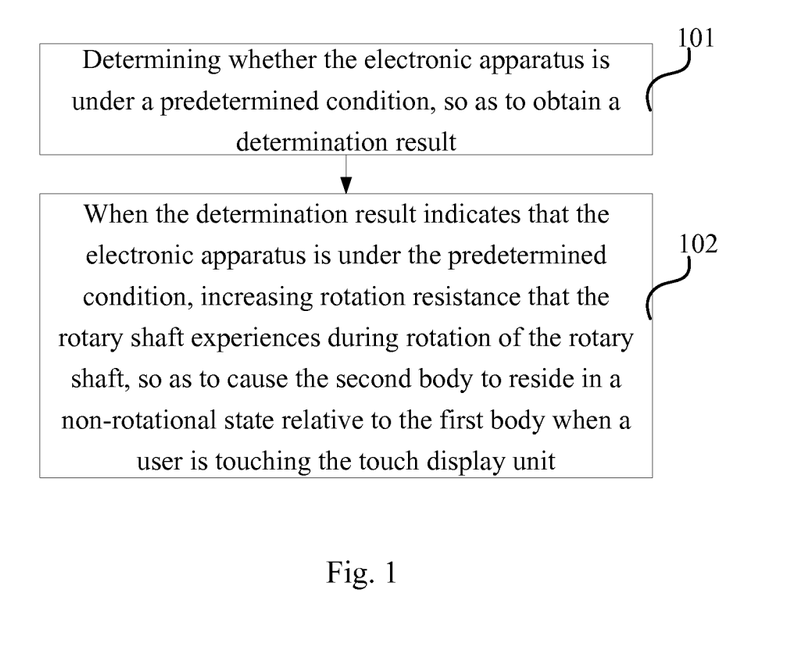
FIG. 1 is a flowchart of the method for controlling electronic apparatus in a first embodiment of the present application.
Figure 2:
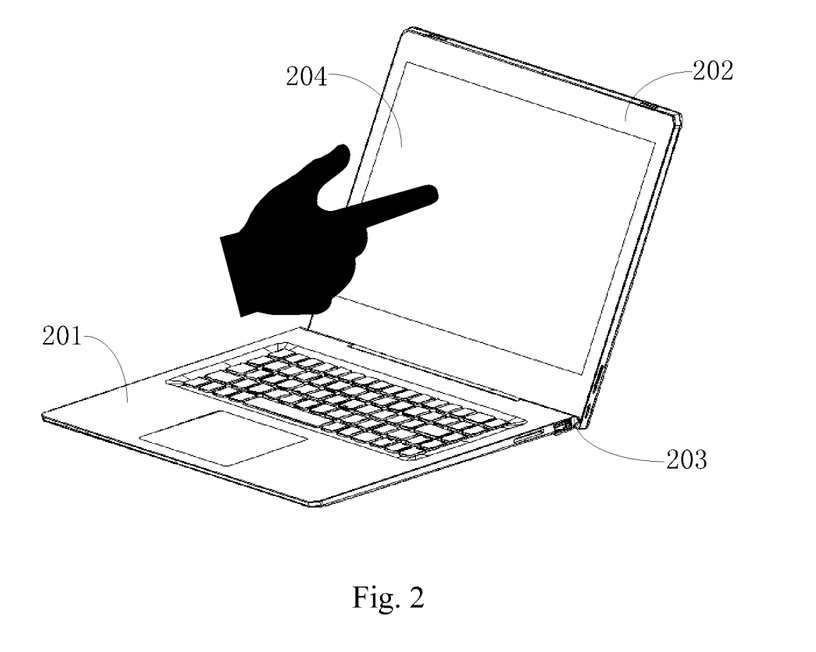
FIG. 2 is a schematic diagram of the first body and the second body being connected based on the first connection mode in the first embodiment of the present application, or a schematic diagram of a notebook computer with a touch display unit.
Figure 3:
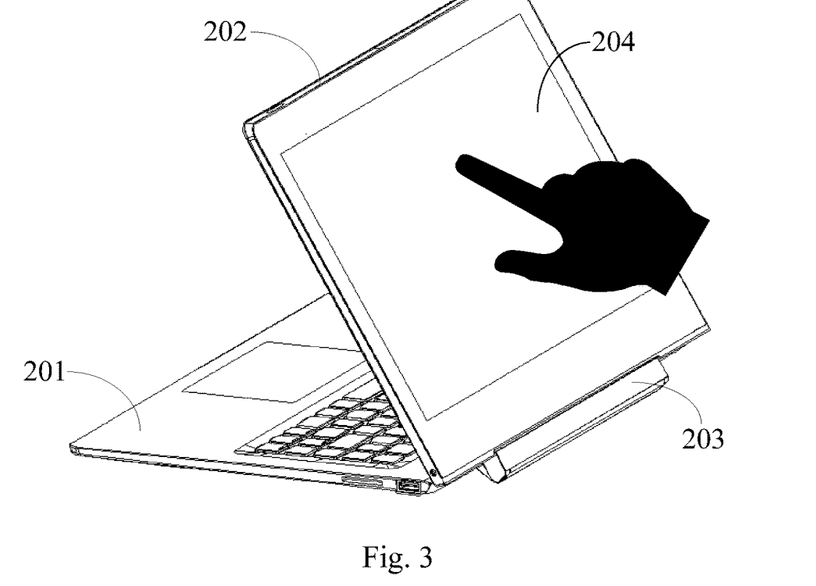
FIG. 3 is a schematic diagram of the first body and the second body being connected based on the second connection mode in the first embodiment of the present application.

As shown in FIGS. 1, 2, and 3, a method for controlling electronic apparatus, being applied to an electronic apparatus including a first body 201, a second body 202 on which a touch display unit 204 is provided, and a rotary shaft 203 used to connect the first body 201 and the second body 202 and through which the second body 202 can rotate relative to the first body 201, the method including:

executing step 101, i.e., determining whether the electronic apparatus is under a predetermined condition, so as to obtain a determination result; and executing step 102 after step 101 is completed, i.e., when the determination result indicates that the electronic apparatus is under the predetermined condition, increasing the rotation resistance that the rotary shaft 203 experiences during rotation of the rotary shaft, so as to cause the second body 202 to reside in a non-rotational state relative to the first body 201 when a user is touching the touch display unit 204.

In a specific implementation, as shown in FIG. 2, the electronic apparatus may be a notebook computer with a touch display screen, in this case, the first body 201 is a host portion of the notebook computer (the host portion includes a notebook keyboard, a mouse touchpad, and main hardware of the notebook computer, wherein the main hardware further includes motherboard, CPU, video card, network card, memory, hard drives, etc.), the second body 202 is a display portion of the notebook computer (the touch display unit 204 is embedded within the display portion). The touch display unit 204 may specifically be a capacitive touch display screen.

In a specific implementation, as shown in FIG. 2, the electronic apparatus may also be a tablet computer assembly, which includes a tablet computer and a keyboard base, in this case, the first body 201 is the keyboard base, the second body 202 is the tablet PC, and a touch display screen 204 is embedded within the second body 202, and the first body 201 can rotate about the second body 202. The tablet assembly can have multiple types of connection mode, in FIG. 2, the tablet computer (i.e., the second body 202) is connected with the keyboard base (i.e., the first body 201) by a "first connection mode", in this case, when the first angle between the first body 201 and the second body 202 is zero degrees (i.e., the tablet computer and the keyboard base are in a folded state), the touch display screen of the tablet computer faces the keyboard of the keyboard base. In FIG.

3, the tablet computer (i.e., the second body 202) is connected the keyboard base (i.e., the first body 201) by a "second connection mode", in this case, when the first angle between the first body 201 and the second body 202 is zero degrees (i.e., the tablet computer and the keyboard base are in a folded state), the touch display screen of the tablet computer has its back towards the keyboard of the keyboard base.

As for what type of electronic apparatus the electronic apparatus is, the embodiment of the present application makes no specific limitation thereto.

In the prior art, when the user is touching the touch display unit 204, the second body 202 is apt to rotate relative to the first body 201, so that the user cannot use the electronic apparatus normally. In the embodiment of the present application, by means of increasing resistance rotation that the rotary shaft 203 experiences during rotation of the rotary shaft when the electronic apparatus is under a predetermined condition, so that the first body 201 and second body 202 are in the non-rotational state, at this time, if the user uses the touch display unit 204 to operate, the second body 202 cannot rotate relative to the first body 201, so that the technical problem that when the user is using the touch display unit, the second body 202 and the first body 201 are apt to rotate is solved.

Furthermore, in order to implement increasing resistance rotation that the rotary shaft 203 experiences during rotation of the rotary shaft, the embodiment of the present application discloses an engagement module.

Figure 4:
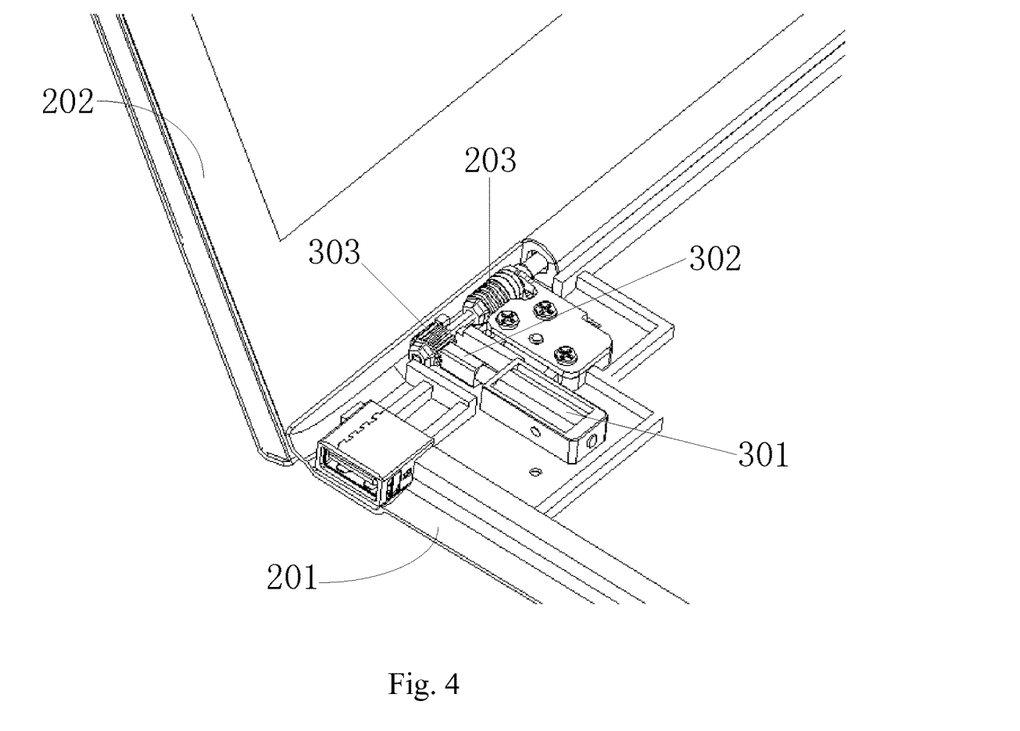
FIG. 4 is an amplified schematic diagram of the engagement module in the first embodiment of the present application.

As shown in FIG. 4, the electronic apparatus further includes
an engagement module, which specifically includes:
a gear 303 connected to the rotary shaft 203;
an electromagnet 301 fixed to the first body 201; and
a movable slot 302 provided on the first body 201,
wherein the movable slot 302 can move to a position where the gear 303 is located under an action of magnetic force of the electromagnet 301, and engage with the gear 303, thereby increases a rotation resistance that the rotary shaft 203 experiences during rotation of the rotary shaft.

In a specific implementation, an end of the movable slot 302 close to the electromagnet 301 has a first magnetism, and the slot movable 302 may be extended freely under an action of the electromagnet 301. For example, when the first magnetism is an S pole, by applying a current A1 to the electromagnet, so that an end of the electromagnet 301 close to the movable slot 302 generates an N pole magnetism, because of "opposite poles attract", so the electromagnet 301 can magnetize the movable slot 302 to cause the movable slot 302 to retract; by applying a current A2 (the current A2 has a direction opposite to that of the current A1) to the electromagnet, so that an end of the electromagnet 301 close to the movable slot 302 also generates an S pole magnetism, because of "like poles repel", so that the electromagnet 301 can repel the movable slot 302, to cause the movable slot 302 to extend outwards, and engage with the gear 303, thereby increases the rotation resistance that the rotary shaft 203 experiences during rotation of the rotary shaft.

In a specific implementation, the movable slot 302 and the gear 303 may be made of plastic, metal, rubber, and other materials, the embodiment of the present application makes no specific limitation to the materials of the movable slot 302 and the gear 303.

In the embodiment of the present application, by increasing the rotation resistance that the rotary shaft 203 experiences during rotation of the rotary shaft, it is achieved that when the user is touching the touch display unit 204, the first body 201 and second body 202 will not rotate. In a specific implementation, under the premise of ensuring that the first body 201 and second body 202 will not rotate when the user is touching the touch display unit 204, the movable slot 302 and the gear 303 can be "fully engaged" or "not fully engaged", if they are "fully engaged", no matter how strong a force the user acts on the second body 202, the first body 201 and the second the body 202 will not rotate; if they are "not fully engaged", that is, when the force that the user acts on the second body 202 is strong enough, the second body 202 can still rotate relative to the first body 201. Herein it should be noted that the force that causes the second body 202 to rotate relative to the first body 201 is significantly stronger than the force acting on the touch display unit 204 when the user is using touch display unit 204 normally.

In a specific implementation, steps 101 and 102 specifically have the following two implementation modes.

First Mode

When the predetermined condition specifically is that a user is touching the touch display unit 204, step 101 specifically is:
determining, through the touch display unit 204, whether the user is touching the touch display unit 204, so as to obtain a first determination result.

In a specific implementation, determining, through the touch display unit 204, whether the user is touching the touch display unit 204 is determining that the user is using the touch display unit 204 to operate the display apparatus.

Furthermore, step 102 specifically is:
when the first determination result indicates that the user is touching the touch display unit 204, applying a first current to the electromagnet 301, causing the electromagnet 301 to generate magnetic force on the movable slot 302, so that the movable slot 302 moves towards a position where the gear 303 is located, and engages with the gear 303, thereby increases the rotation resistance that the rotary shaft 203 experiences during rotation of the rotary shaft.

In a specific implementation, when it is confirmed that the user is using the touch display unit 204 to operate the electronic apparatus, a current is applied to the electromagnet 301, so that the electromagnet 301 can repel the movable slot 302, cause the movable slot 302 to engage with the gear 303, thereby increase the rotation resistance that the rotary shaft 203 experiences during rotation of the rotary shaft, so that the second body 202 is in a non-rotational state relative to the first body 201, and thereby a notebook computer with a touch display screen in the prior art has a technical problem that when a user touches the touch display screen, the touch display screen is apt to rotate against a keyboard base is solved.

Second Mode

The first body and the second body are two detachable bodies, the second body 202 can be detached from the first body 201, and a connection mode between the second body 202 and the first body 201 has a "first connection mode" and a "second connection mode" different from the first connection mode, wherein the first body 201 includes a first front plane within which a keyboard is embedded, and the second body 202 includes a second front plane within which the touch display unit 204 is embedded.

As shown in FIG. 2, the first connection mode is a connection mode in which the second front plane can face the first front plane when a first angle value of a first angle between the second body 202 and the first body 201 is zero degrees;

As shown in FIG. 3, the second connection mode is a connection mode in which the second front plane can have its back towards the first front plane when the first angle value of a first angle between the second body 202 and the first body 201 is zero degrees.

In a specific implementation, as shown in FIGS. 2 and 3, the electronic apparatus may also be a tablet computer assembly, which includes a tablet computer and a keyboard base, in this case, the keyboard base is the first body 201, the tablet PC is the second body 202, and the first body 201 and the second body 202 are connected via a rotary shaft 203, meanwhile the first body 201 and the second body 202 have two different connection modes, that is, the "first connection mode" and the "second connection mode".

As shown in FIG. 2, which is an effect diagram after the first body 201 and the second body 202 are connected based on the "first connection mode", thus it can be seen that, in this case, the second body 202 is "front inserted" in the first body 201, the plane having the touch display screen of the second body 202 (i.e., the first front plane) faces the plane having the keyboard of the first body 201 (i.e., the second front plane).

As shown in FIG. 3, which is an effect diagram after the first body 201 and the second body 202 are connected based on the "second connection mode", thus it can be seen that, in this case, the second body 202 is "back inserted" in the first body 201, the plane having the touch display screen of the second body 202 (i.e., the first front plane) has its back towards the plane having the keyboard of the first body 201 (i.e., the second front plane).

In a specific implementation, the rotary shaft 203 is fixed to the first body 201, and a groove is provided on the rotary shaft 203, so that the second body 202 can be inserted and fixed in the groove, so as to achieve the purpose of being connected with the first body 201.

In a specific implementation, the electronic apparatus can recognize that the connection mode between the first body 201 and the second body 202 is the "first connection mode" or the "second connection mode" in particular, its implementation process is as follows.

Two contact points are set on a side for inserting the groove of the second body 202, i.e., contact point pin_a1 and contact point pin_a2, and two contact points are provided in the groove, i.e., contact point pin_b1 and contact point pin_b2. When the second body 202 is connected to the first body 201 by the "first connection mode", the contact point pin_a1 and the contact point pin_b1 contact, and the contact point pin_a2 and the touch point pin_b2 contact, when the electronic apparatus detects that the contact point pin_a1 and the contact point pin_b1 contact, and the contact point pin_a2 and the touch point pin_b2 contact, it recognizes that the connection mode between the first body 201 and the second body 202 is the "first connection mode". When the second body 202 is connected to the first body 201 by the "second connection mode", the contact point pin_a1 and the contact point pin_b2 contact, and the contact point pin_a2 and the touch point pin_b1 contact, when the electronic apparatus detects that the contact point pin_a1 and the contact point pin_b2 contact, and the contact point pin_a2 and the touch point pin_b1 contact, it recognizes that the connection mode between the first body 201 and the second body 202 is the "second connection mode".

Hereinafter, cases A and B will be classified and introduced according to the different connection modes.

Case A

When the connection mode is the "first connection mode", and the predetermined condition specifically is that the first angle value is larger than a first predetermined angle value, step 101 specifically includes:

acquiring the first angle value; and determining whether the first angle value is larger than the first predetermined angle value, so as to obtain a second determination result.

In a specific implementation, the first angle value may be acquired through an angle detection device (e.g., a gyro). The value range of the first predetermined angle value is: 105 to 135 degrees, such as 105 degrees, or 115 degrees, or 125 degrees, or 135 degrees.

Based on the user's habits, when the first body 201 and the second body 202 are connected in the "first connection mode", an optimum angle of the first angle that the user uses the touch display unit 204 is greater than 105 degrees, so in this case, the range of the first predetermined angle is determined as 105 to 135 degrees.

Furthermore, step 102 specifically is:

when the second determination result indicates that the first angle value is larger than the first predetermined angle value, applying a first current to the electromagnet 301, causing the electromagnet 301 to generate the magnetic force on the movable slot 302, so that the movable slot 302 moves towards a position where the gear 303 is located, and engages with the gear 303, thereby increases the rotation resistance that the rotary shaft 203 experiences during rotation of the rotary shaft.

Case B

When the connection mode is the "second connection mode", and the predetermined condition specifically is that the first angle value is smaller than a second predetermined angle value, step 101 specifically includes:

acquiring the first angle value; and determining whether the first angle value is smaller than the second predetermined angle value, so as to obtain a third determination result.

In a specific implementation, the first angle value may be acquired through an angle detection device (e.g., a gyro). The value range of the first predetermined angle value is: 45 to 75 degrees, such as 45 degrees, or 55 degrees, or 65 degrees, or 75 degrees.

Based on the user's habits, when the first body 201 and the second body 202 are connected in the "second connection mode", an optimum angle of the first angle that the user uses the touch display unit 204 is less than 75 degrees, so in this case, the range of the first predetermined angle is determined as 45 to 75 degrees.

Furthermore, step 102 specifically is:

when the third determination result indicates that the first angle value is smaller than the second predetermined angle value, applying a first current to the electromagnet 301, causing the electromagnet 301 to generate the magnetic force on the movable slot 302, so that the movable slot 302 moves towards a position where the gear 303 is located, and engages with the gear 303, thereby increases the rotation resistance that the rotary shaft 203 experiences during rotation of the rotary shaft.

Based on the same inventive concept, another embodiment of the present application provides an electronic apparatus that implements the method for processing information in the embodiment of the present application.

Figure 5:
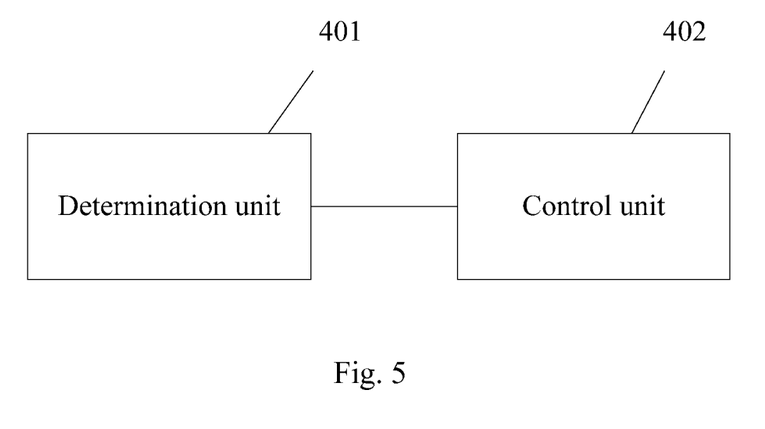
FIG. 5 is a structural schematic diagram of the electronic apparatus in the first embodiment of the present application.

As shown in FIG. 5, an electronic apparatus including a first body 201, a second body 202 on which a touch display unit 204 is provided, and a rotary shaft 203 used to connect the first body 201 and the second body 202 and through which the second body 202 can rotate relative to the first body 201, the electronic apparatus further including:

a determination unit 401 for determining whether the electronic apparatus is under a predetermined condition, so as to obtain a determination result; and a control unit 402 for, when the determination result indicates that the electronic apparatus is under the predetermined condition, increasing a rotation resistance that the rotary shaft 203 experiences during rotation of the rotary shaft, so as to cause the second body 202 to reside in a non-rotational state relative to the first body 201 when a user is touching the touch display unit 204.

Furthermore, the electronic apparatus further includes:
an engagement module, which specifically includes:
a gear 303 connected to the rotary shaft 203;
an electromagnet 301 fixed to the first body 201; and
a movable slot 302 provided on the first body 201,
wherein the movable slot 302 can move to a position where the gear 303 is located under an action of magnetic force of the electromagnet 301, and engage with the gear 303, thereby increase a rotation resistance that the rotary shaft 203 experiences during rotation of the rotary shaft.

Furthermore, the determination unit 401 specifically is:
a first determination configured to when the predetermined condition specifically is that a user is touching the touch display unit 204, determine, through the touch display unit 204, whether the user is touching the touch display unit 204, so as to obtain a first determination result.

Furthermore, the control unit specifically is:
a first control configured to when the first determination result indicates that the user is touching the touch display unit 204, apply a first current to the electromagnet 301, cause the electromagnet 301 to generate the magnetic force on the movable slot 302, so that the movable slot 302 moves towards a position where the gear 303 is located, and engages with the gear 303, thereby increases the rotation resistance that the rotary shaft 203 experiences during rotation of the rotary shaft.

Furthermore, the second body 202 can be detached from the first body 201, and a connection mode between the second body 202 and the first body 201 has a first connection mode and a second connection mode different from the first connection mode.

Furthermore, the first body 201 includes a first front plane within which a keyboard is embedded, and the second body 202 includes a second front plane within which the touch display unit 204 is embedded;

in this case, the first connection mode is a connection mode in which the second front plane can face the first front plane when a first angle value of a first angle between the second body 202 and the first body 201 is zero degrees; and the second connection mode is a connection mode in which the second front plane can have its back towards the first front plane when the first angle value between the second body 202 and the first body 201 is zero degrees.

Furthermore, the determination unit 401 specifically includes:
a first acquisition configured to when the connection mode is the first connection mode, and the predetermined condition specifically is that the first angle value is larger than a first predetermined angle value, acquire the first angle value; and
a second determination subunit for determining whether the first angle value is larger than the first predetermined angle value, so as to obtain a second determination result.

Furthermore, the control unit 402 specifically is:
a second control configured to when the second determination result indicates that the first angle value is larger than the first predetermined angle value, apply a first current to the electromagnet 301, cause the electromagnet 301 to generate the magnetic force on the movable slot 302, so that the movable slot 302 moves towards a position where the gear 303 is located, and engages with the gear 303, thereby increases the rotation resistance that the rotary shaft 203 experiences during rotation of the rotary shaft.

Furthermore, the determination unit 401 specifically includes:
a second acquisition configured to when the connection mode is the second connection mode and the predetermined condition specifically is that the first angle value is smaller than a second predetermined angle value, acquire the first angle value; and
a third determination subunit for determining whether the first angle value is smaller than the second predetermined angle value, so as to obtain a third determination result.

Furthermore, the control unit 402 specifically is:
a third control configured to when the third determination result indicates that the first angle value is smaller than the second predetermined angle value, apply a first current to the electromagnet 301, cause the electromagnet 301 to generate the magnetic force on the movable slot 302, so that the movable slot 302 moves towards a position where the gear 303 is located, and engages with the gear 303, thereby increases the rotation resistance that the rotary shaft 203 experiences during rotation of the rotary shaft.

Since the electronic apparatus introduced in this embodiment is the electronic apparatus that is adopted for implementing the method for controlling electronic apparatus, based on the method for controlling electronic apparatus introduced in the embodiment of the present application, a person skilled in the art can learn the specific implementation modes of the electronic apparatus in this embodiment and various variables thereof, therefore no more detailed introductions are provided for how the electronic apparatus implements the method in the embodiment of the present application. If only a person skilled in the art implements the electronic apparatus adopted by the method for controlling electronic apparatus in the embodiment of the present application, it all belongs to the scope claimed by the present application.

The technical solutions described above in embodiments of the present application at least have the following technical effects or advantages:

1. In an embodiment of the present application, there is disclosed a method for controlling electronic apparatus, being applied to an electronic apparatus including a first body, a second body on which a touch display unit is provided, and a rotary shaft used to connect the first body and the second body and through which the second body can rotate relative to the first body, the method including: determining whether the electronic apparatus is under a predetermined condition, so as to obtain a determination result; and when the determination result indicates that the electronic apparatus is under the predetermined condition, controlling the rotary shaft to be in a locking status, so as to cause the second body to reside in a non-rotational state relative to the first body when a user is touching the touch display unit. Therefore, a notebook computer with a touch display screen has a technical problem that when a user touches the touch display screen, the touch display screen is apt to rotate against a keyboard base in the prior art is solved efficiently, thereby the technical effect that when a user is using a notebook computer with a touch display screen, the touch display screen will not rotate against a keyboard base, thus bringing use convenience to the user is achieved.

2. In an embodiment of the present application, by means of detecting whether a user is using the touch display unit, increasing the rotation resistance that the rotary shaft experiences during rotation of the rotary shaft when the user is using the touch display unit, so as to cause the second body and the first body to reside in a non-rotational state, not increasing the rotation resistance when the user is not using the touch display unit, at this time the user can easily rotate the first body and the second body, thereby the technical effect of controlling the rotation resistance on the rotary shaft accurately according to the user's use requirements is achieved.

3. In an embodiment of the present application, the first body and the second body are two detachable bodies, and there are two connection modes between the first body and the second body, i.e., the "first connection mode" shown in FIG. 2 and the "second connection mode" shown in FIG. 3. The embodiment of the present application is based on different connection modes between the first body and the second body, and an angle range of the first angle between the first body and the second body as habitually set by the user when using the touch display unit, by determining whether the first angle is within the angle range, if yes, the rotation resistance on the rotary shaft is increased, so as to cause the second body to reside in a non-rotational state relative to the first body when the user is touching the touch display unit. Thereby the technical effect of combining the using habits of the user to adjust the rotation resistance on the rotary shaft, and meet the user's actual needs is achieved. For example, when the connection mode between the first body and the second body is the "first connection mode", the user habitually sets the first angle to an angle larger than 105 degrees when using the touch display screen, in this case, by detecting whether the first angle is greater than 105 degrees, if yes, then the rotation resistance on the rotary shaft is increased, so that the first body and the second body cannot rotate relatively, if not, the rotation resistance on the rotary shaft will not be increased, so that the first body and the second body can be rotated freely.

A person skilled in the art should understand that, the embodiments of the present application can be provided as a method, a system or a computer program product. Therefore, the present application can adopt forms of a full hardware embodiment, a full software embodiment, or an embodiment combining software and hardware aspects. And, the present application can adopt forms of a computer program product implemented on one or more computer usable storage mediums (including, but not limited to, magnetic disk storage, CD-ROM, optical memory, or the like) including computer usable program codes.

The present application is described by referring to flow charts and/or block diagrams of method, apparatus (system) and computer program product according to the embodiments of the present application. It should be understood that each flow and/or block in the flow charts and/or block diagrams and the combination of the flow and/or block in the flow charts and/or block diagrams can be implemented by computer program instructions. These computer program instructions can be provided to processors of a general purpose computer, a dedicated computer, an embedded processor or other programmable data processing apparatus to generate a machine, so that a device for implementing functions specified in one or more flows of the flow charts and/or one or more blocks of the block diagrams is generated by the instructions executed by the processors of the computer or other programmable data processing apparatus.

These computer program instructions can also be stored in computer readable storage which is able to direct the computer or other programmable data processing apparatus to operate in specific manners, so that the instructions stored in the computer readable storage generate manufactured articles including commander equipment, which implements functions specified by one or more flows in the flow charts and/or one or more blocks in the block diagrams.

These computer program instructions can be also loaded to computer or other programmable data processing apparatus, so that a series of operation steps are executed on the computer or other programmable apparatus to generate computer implemented process, so that the instructions executed on the computer or other programmable apparatus provide steps for implementing functions specified in one or more flows of the flow charts and/or one or more blocks of the block diagrams.

Although the preferred embodiments of the present application have been described, a person skilled in the art can make additional changes and modifications to these embodiments once learning the basic inventive concepts thereof. Therefore, the appended claims are intended to be interpreted as including the preferred embodiments as well as all changes and modifications that fall into the scope of the present application.

Obviously, a person skilled in the art can make various modifications and variations to the present application without departing from the spirit and scope thereof. Thus, if these modifications and variations to the present application are within the scope of the claims of the present application as well as their equivalents, the present application is also intended to include these modifications and variations.

The invention claimed is:

1. A method for controlling an electronic apparatus that includes a first body, a second body on which a touch display unit is provided, and a rotary shaft used to connect the first body and the second body and through which the second body can rotate relative to the first body, the method comprising:
   determining whether the electronic apparatus is under a predetermined condition, so as to obtain a determination result; and
   when the determination result indicates that the electronic apparatus is under the predetermined condition, increasing a rotation resistance that the rotary shaft experiences during rotation of the rotary shaft, so as to cause the second body to reside in a non-rotational state relative to the first body when a user is touching the touch display unit,
   wherein the second body can be detached from the first body, and a connection mode between the second body and the first body has a first connection mode and a second connection mode different from the first connection mode.

2. The method according to claim 1, wherein the electronic apparatus further includes an engagement module that includes a gear connected to the rotary shaft; an electromagnet fixed to the first body; and a movable slot provided on the first body, wherein the movable slot can move to a position where the gear is located under an action of magnetic force of the electromagnet, and engage with the gear, to thereby increase the rotation resistance that the rotary shaft experiences during rotation of the rotary shaft.

3. The method according to claim 2, wherein determining whether the electronic apparatus is under a predetermined condition so as to obtain a determination result comprises determining, through the touch display unit, whether the user is touching the touch display unit, so as to obtain a first determination result.

4. The method according to claim 3, wherein when the determination result indicates that the electronic apparatus is under the predetermined condition, increasing a rotation resistance that the rotary shaft experiences during rotation of the rotary shaft comprises applying a first current to the electromagnet when the first determination result indicates that the user is touching the touch display unit to cause the electromagnet to generate the magnetic force on the movable slot, so that the movable slot moves towards a position where the gear is located, and engages with the gear, to thereby increase the rotation resistance that the rotary shaft experiences during rotation of the rotary shaft.

5. The method according to claim 1, wherein the first body includes a first front plane within which a keyboard is embedded, and the second body includes a second front plane within which the touch display unit is embedded; and wherein
the first connection mode is a connection mode in which the second front plane can face the first front plane when a first angle value of a first angle between the second body and the first body is zero degrees; and
the second connection mode is a connection mode in which the second front plane can have its back towards the first front plane when the first angle value of the first angle between the second body and the first body is zero degrees.

6. The method according to claim 5, when the connection mode is the first connection mode and the predetermined condition is that the first angle value is larger than a first predetermined angle value, determining whether the electronic apparatus is under a predetermined condition so as to obtain a determination result comprises:
acquiring the first angle value; and
determining whether the first angle value is larger than the first predetermined angle value, so as to obtain a second determination result.

7. The method according to claim 6, wherein when the determination result indicates that the electronic apparatus is under the predetermined condition, increasing a rotation resistance that the rotary shaft experiences during rotation of the rotary shaft comprises when the second determination result indicates that the first angle value is larger than the first predetermined angle value, applying a first current to the electromagnet, causing the electromagnet to generate the magnetic force on the movable slot, so that the movable slot moves towards a position where the gear is located, and engages with the gear, thereby increases the rotation resistance that the rotary shaft experiences during rotation of the rotary shaft.

8. The method according to claim 5, wherein when the connection mode is the second connection mode and the predetermined condition is that the first angle value is smaller than a second predetermined angle value, determining whether the electronic apparatus is under a predetermined condition so as to obtain a determination result comprises:
acquiring the first angle value; and
determining whether the first angle value is smaller than the second predetermined angle value, so as to obtain a third determination result.

9. The method according to claim 8, wherein when the determination result indicates that the electronic apparatus is under the predetermined condition, increasing a rotation resistance that the rotary shaft experiences during rotation of the rotary shaft comprises when the third determination result indicates that the first angle value is smaller than the second predetermined angle value, applying a first current to the electromagnet, causing the electromagnet to generate the magnetic force on the movable slot, so that the movable slot moves towards a position where the gear is located, and engages with the gear, thereby increases the rotation resistance that the rotary shaft experiences during rotation of the rotary shaft.

10. An electronic apparatus comprising a first body, a second body on which a touch display unit is provided, and a rotary shaft used to connect the first body and the second body and through which the second body can rotate relative to the first body, the electronic apparatus further comprising:
a determination unit for determining whether the electronic apparatus is under a predetermined condition, so as to obtain a determination result; and
a control unit for increasing a rotation resistance that the rotary shaft experiences during rotation of the rotary shaft, when the determination result indicates that the electronic apparatus is under the predetermined condition to cause the second body to reside in a non-rotational state relative to the first body when a user is touching the touch display unit,
wherein the second body can be detached from the first body, and a connection mode between the second body and the first body has a first connection mode and a second connection mode different from the first connection mode.

11. The electronic apparatus according to claim 10, wherein the electronic apparatus further comprises:
an engagement module, which specifically includes:
a gear connected to the rotary shaft;
an electromagnet fixed to the first body; and
a movable slot provided on the first body and configured to be movable to a position where the gear is located under an action of magnetic force of the electromagnet, and engage with the gear, to thereby increase a rotation resistance that the rotary shaft experiences during rotation of the rotary shaft.

12. The electronic apparatus according to claim 11, wherein the determination unit comprises a first determination configured to when the predetermined condition specifically is that a user is touching the touch display unit, determine, through the touch display unit, whether the user is touching the touch display unit, so as to obtain a first determination result.

13. The electronic apparatus according to claim 12, wherein the control unit comprises a first control configured to apply a first current to the electromagnet, when the first determination result indicates that the user is touching the touch display unit to cause the electromagnet to generate the magnetic force on the movable slot, so that the movable slot moves towards a position where the gear is located, and engages with the gear, to thereby increase the rotation resistance that the rotary shaft experiences during rotation of the rotary shaft.

14. The electronic apparatus according to claim 11, wherein the first body includes a first front plane within which a keyboard is embedded, and the second body includes a second front plane within which the touch display unit is embedded;
wherein, the first connection mode is a connection mode in which the second front plane can face the first front plane when a first angle value of a first angle between the second body and the first body is zero degrees; and the second connection mode is a connection mode in which the second front plane can have its back towards the first front plane when the first angle value of a first angle between the second body and the first body is zero degrees.

15. The electronic apparatus according to claim 14, wherein the determination unit comprises:
   a first acquisition configured to when the connection mode is the first connection mode, and the predetermined condition specifically is that the first angle value is larger than a first predetermined angle value, acquiring the first angle value; and
   a second determination subunit for determining whether the first angle value is larger than the first predetermined angle value, so as to obtain a second determination result.

16. The electronic apparatus according to claim 15, wherein the control unit comprises:
   a second control configured to apply a first current to the electromagnet when the second determination result indicates that the first angle value is larger than the first predetermined angle value to cause the electromagnet to generate the magnetic force on the movable slot, so that the movable slot moves towards a position where the gear is located, and engages with the gear, to thereby increases the rotation resistance that the rotary shaft experiences during rotation of the rotary shaft.

17. The electronic apparatus according to claim 14, wherein the determination unit comprises:
   a second acquisition configured to acquire the first angle value when the connection mode is the second connection mode and the predetermined condition is that the first angle value is smaller than a second predetermined angle value; and
   a third determination subunit for determining whether the first angle value is smaller than the second predetermined angle value, so as to obtain a third determination result.

18. The electronic apparatus according to claim 17, wherein the control unit comprises a third control configured to apply a first current to the electromagnet when the third determination result indicates that the first angle value is smaller than the second predetermined angle value to cause the electromagnet to generate the magnetic force on the movable slot, so that the movable slot moves towards a position where the gear is located, and engages with the gear, to thereby increase the rotation resistance that the rotary shaft experiences during rotation of the rotary shaft.

* * * * *